United States Patent [19]
Hart

[11] Patent Number: 5,984,426
[45] Date of Patent: Nov. 16, 1999

[54] APPARATUS AND METHOD FOR A RAILWAY FREIGHT CAR BRAKE CONTROL

[75] Inventor: James E. Hart, Westmoreland County, Pa.

[73] Assignee: Westinghouse Air Brake Company, Wilmerding, Pa.

[21] Appl. No.: 08/903,960

[22] Filed: Jul. 31, 1997

[51] Int. Cl.⁶ ....................................................... B60T 7/00
[52] U.S. Cl. ................................................. 303/15; 303/43
[58] Field of Search .................................. 303/80, 9, 43, 303/85, 30, 3, 15

[56] References Cited

U.S. PATENT DOCUMENTS

| | | | |
|---|---|---|---|
| 1,199,840 | 10/1916 | Turner | 303/85 |
| 3,572,849 | 3/1971 | Engle | 303/25 |
| 4,080,005 | 3/1978 | Engle | 303/22 |
| 4,127,308 | 11/1978 | McEathron | 303/35 |
| 4,188,071 | 2/1980 | Hart | 303/33 |
| 4,652,057 | 3/1987 | Engle et al. | 303/3 |
| 4,653,812 | 3/1987 | Engle | 303/8 |
| 4,775,194 | 10/1988 | Vaughn et al. | 303/74 |
| 5,494,342 | 2/1996 | Engle | 303/3 |
| 5,862,048 | 1/1999 | Knight | 303/15 |
| 5,887,953 | 3/1999 | Wood et al. | 303/15 |

*Primary Examiner*—Robert J. Oberleitner
*Assistant Examiner*—Robert A. Siconolfi
*Attorney, Agent, or Firm*—Buchanan Ingersoll, P.C.

[57] ABSTRACT

The railway freight car brake control utilizes sequential pressurization of the brake cylinder from a first auxiliary reservoir and a second auxiliary reservoir during emergency. Embodiments utilize a first supply reservoir larger in volume than a second supply reservoir. The first supply reservoir is used during a service braking mode. The larger first supply reservoir provides improved braking in a service mode, while the sequential utilization of both reservoirs provides an improved level of emergency braking available during a loaded freight car condition.

27 Claims, 4 Drawing Sheets

APPARATUS AND METHOD FOR A RAILWAY FREIGHT CAR BRAKE CONTROL

FIELD OF THE INVENTION

This invention relates to the field of railway freight car braking. The invention provides improved braking performance by obtaining higher than the previous normal service and emergency brake cylinder pressures. Higher brake cylinder pressures can be provided such as to increase the effective net braking ratio on loaded cars and increase the maximum available brake retarding force on the car.

PRIOR ART

For at least the last 100 years, pneumatic braking has been utilized onboard railway freight cars in which a brake pipe runs the length of the freight train providing a source of pressurized air to each individual car of the train. Braking conditions of the train are controlled by changes in the brake pipe pressure. Traditionally, onboard each freight car is a control valve which responds to the brake pipe conditions to either charge onboard reservoirs, apply the brakes, or release the brakes. Such pneumatic controls have advanced to provide a high degree of train control through the utilization of the changes in brake pipe pressure. Most of the present freight car fleet utilizes such control techniques. Control valves using this type of control are generally represented by the ABD/ABDW/ABDX/DB60, and related control valves. All of these systems are dependent upon the promulgation of the pneumatic brake pipe signal throughout the train. Generally, the pneumatic signal is initiated by the lead locomotives in the train, however, some systems have been proposed and used where brake pipe pressures can be controlled in addition, at the rear or at spaced intermediate positions within the train. However, all such pneumatic systems depend upon the transmission of a pneumatic pressure change to effect braking.

Such valves are used in a car brake system having separate auxiliary and emergency reservoirs. These reservoirs may be fabricated or cast but have traditionally included an emergency reservoir larger than the auxiliary reservoir. In the charging mode the control valve feeds both the auxiliary and the emergency reservoirs from the brake pipe. For many years the standard has been that the auxiliary reservoir volume equals approximately 2,500 cubic inches, and the emergency reservoir equals approximately 3,500 cubic inches.

Particularly, such control valves can implement two modes of friction braking, service braking and emergency braking. In the service mode the control valve responds to a desired service level of braking as indicated by changes in brake pipe pressure and a service rate of pressure change. During this mode the control valve may apply any level of braking up to a full service brake application. During the service mode the control valve uses the pressurized air stored in an auxiliary reservoir to feed the brake cylinder. At a full service level the control valve permits the auxiliary reservoir to be directly connected to the brake cylinder so that the pressure in the brake cylinder generally equalizes with the pressure in the auxiliary reservoir.

Such prior art control valves in the emergency mode generally connect all three volumes, brake cylinder, auxiliary reservoir, and emergency reservoir together. All three chambers can equalize to provide a higher pressure in the brake cylinder than if only the auxiliary reservoir had been allowed to equalize in the brake cylinder. In this manner the emergency brake pressure and the corresponding emergency brake retardation forces are increased over the full service application. Present standards indicate that the maximum emergency brake cylinder pressure should exceed the full service brake pressure by 15 to 20%.

Empty cars cannot utilize the same level of braking as loaded cars, because the lightly loaded cars are more likely to have their wheels lock and skid at a braking level that would be accepted on a fully loaded car. Locked wheels on empty or lightly loaded cars cannot only result in longer stopping distances but can also produce undesired wheel damage and track wear. It has therefore been an acceptable practice to provide freight cars with empty-load equipment, which senses the load of the car and reduces the brake cylinder pressure on cars that are not fully loaded.

Many of the above operational techniques have been incorporated into electromagnetic freight braking systems. In these systems, separate valves such as electrically operated solenoid valves respond to permit equalization between the auxiliary reservoir and the brake cylinder under fall service conditions and equalize auxiliary and emergency reservoirs under emergency conditions. One significant difference is that electro-pneumatic brakes are typically controlled by electrical signals and, therefore, are not dependent on pressure changes in the brake pipe.

In addition, pneumatic brake systems try to achieve generally more equal retardation between individual freight cars so as to minimize in-train forces. If certain cars are trying to brake at high deceleration level, while other cars are providing no brake retardation forces, excessive in-train forces can result in equipment damage.

U.S. Pat. No. 4,188,071 describes a pneumatic brake device which produces normal emergency brake cylinder pressures with an emergency reservoir substantially smaller than the 2,500 cubic inch auxiliary reservoir. The emergency reservoir can be only a 1,200 cubic inch volume as compared to a standard 3,500 cubic inch volume while still maintaining normal full service and emergency level braking pressures. This patent teaches connecting a standard volume auxiliary reservoir to the brake cylinder for service applications. During an emergency application the standard volume auxiliary reservoir is first connected to the brake cylinder then cut off from the brake cylinder. Subsequently a small volume emergency reservoir is connected to the brake cylinder to get normal emergency pressures.

BACKGROUND OF THE INVENTION

The invention provides improved braking and railway freight cars by providing the ability to operate at higher than standard levels for full service and emergency braking on loaded cars. Higher brake cylinder pressures can provide higher effective net braking ratios on loaded car and increase the maximum available brake retarding force on such loaded cars. This is of particular importance on steep downgrades, for the increase in available braking force and stopping power can enhance operational performance. Importantly, it is possible to provide this increase in braking force on loaded cars without danger of sliding wheels or overheating wheels. The invention also recognizes and takes advantage of the simultaneous brake response of an electro-pneumatic brake system, in that higher retardation of loaded cars can be obtained without creating excessive run-in forces in the train. Conversely, the slower, serial brake signal speed with pneumatic brakes limits the acceptable loaded car retardation without causing excessive run-in forces among cars in the train.

Almost all interchange freight cars are equipped with standard, two-compartment reservoirs consisting of a 2,500 cubic inch auxiliary reservoir and an approximately 3,500 inch emergency reservoir. In normal operation these reservoirs can be charged with compressed air from the brake pipe to approximately the same operating pressure as the brake pipe, typically between 70 and 110 psi. With conventional freight brake equipment, there are two different modes of braking, service and emergency. Service braking is the normal mode and is typically used to balance grade accelerating force and to control speed or stop the train. The compressed air stored in the auxiliary reservoir is used to supply the brake cylinder pressure called for during service braking operations. When a fill service brake application is made, the auxiliary reservoir pressure flows into the brake cylinder, reducing the auxiliary reservoir and increasing the brake cylinder pressure until the two pressures equalize. This generally represents the maximum service brake cylinder pressure available, i.e., a fall service application.

Emergency brake applications are used generally only when unusual circumstances require the train to be braked at the maximum. Emergency applications transmit through the train more rapidly than service applications, and in compliance with regulations, must provide 15% to 20% higher brake cylinder pressure than full service applications. When an emergency application is made in prior art equipment, the higher brake cylinder pressure is obtained by generally simultaneously connecting both the auxiliary reservoir and the emergency reservoir with the brake cylinder. This causes the pressure in all three chambers to equalize at a controlled rate. Normally no higher brake cylinder pressure can be obtained than this emergency equalization pressure, which is typically 17% to 19% higher than a full service equalization pressure. The difference is determined by the relative volumes of the reservoirs.

Theoretical full service and emergency equalization brake cylinder pressures for conventional freight brake equipment are listed on Chart 1. Some minor variations are common in actual brake cylinder pressure, as a result of allowable variations in piping volumes and the brake cylinder piston travel. Chart 1 shows typical ratios between emergency and fill service brake application pressures based upon initial brake pipe and system pressure.

CHART 1

| Initial System Pressure | Service Equalization | Emergency Equalization | Ratio Emer./Service |
|---|---|---|---|
| 70 psi | 51.0 psi | 60.8 psi | 1.192 |
| 80 psi | 58.7 psi | 69.7 psi | 1.187 |
| 90 psi | 66.4 psi | 78.6 psi | 1.184 |
| 100 psi | 74.1 psi | 87.5 psi | 1.181 |
| 110 psi | 81.7 psi | 96.4 psi | 1.179 |

The relative braking forces used on freight cars is reflected in the net braking ratio of the cars. The net braking ratio is the total actual force developed to apply the brake shoes to the treads of the wheels divided by the weight of the car. The net braking ratio on a fully loaded car with 50 psi in the brake cylinder or cylinders represents the design braking ratio of the car. The braking ratio at any given brake cylinder pressure for a particular state of car loading can be considered to be the effective braking ratio for those particular conditions. Typically, the total net shoe forces are not proportioned to car weight through the full possible load range of the car, and therefore the empty car braking ratios are much higher than the loaded car braking ratios. Typical loaded car braking ratios vary from 6.5% to 10% at 50 psi brake cylinder. Empty car net braking ratios can vary from 20% to 30% for brake cylinder pressures that may be 50 psi or may be reduced from 50 psi by empty/load equipments. For a given coefficient of brake shoe friction, the potential braking deceleration of freight cars is generally proportional to their effective net braking ratios. Potential deceleration is the braking deceleration which would occur if the car was not in a train with other cars and locomotives, that is, its independent deceleration based upon its own onboard brake system without acceleration or deceleration imported from adjacent cars through the respective couplings.

The amount of brake cylinder pressure and resultant shoe force that can be safely and effectively used on railway freight cars is limited by a number of factors. The ultimate limit is the pressure and shoe force which produces sufficient retarding force to exceed the available rolling adhesion and risk a locked up condition in which the steel wheels slide on the steel rails. Another limiting factor with friction braking on wheel treads is the thermal capacity of the wheels to absorb and dissipate the heat created by braking without damage to the wheel. A third and significant limiting factor is the level of longitudinal buff and draft forces that can be created among cars in a train during braking. Finally, there are practical limitations on pneumatic pressures, physical reservoirs and cylinder sizes and mechanical leverage ratios that can be employed.

As a result of these and other limitations, braking forces typically employed on freight cars are not high enough to create a risk of sliding wheels unless the car is empty or very lightly loaded. With loaded trains there are two primary limitations of the maximum braking forces or braking ratios that can be employed. One is the brake horsepower that can be used on long, steep grades without overheating wheels, and the second is the need to control the longitudinal forces between cars, particularly during emergency braking. The grade braking horsepower can be effectively controlled by limiting the operating speed on the grade, regardless of how much reserve braking is available. Because the grade braking situation usually requires braking control over long periods of time, the wheel heating limitations previously discussed may not permit a higher level of braking and, therefore, grade braking is usually somewhat less than full service.

The primary limitation on braking for loaded cars, therefore, is the need to control longitudinal forces, in-train dynamic forces. The major cause of high longitudinal forces that develop between cars during braking is the serial, front to rear transmission of pneumatic brake signals on long trains. The cars at the front of the train develop effective retarding forces before the brake application signal reaches the rear of the train, which causes the front to begin to decelerate first and the rear cars to progressively drive into and be restrained by the forward cars. Therefore, the higher the effective braking and retardation is on the forward cars in the train, the greater the run-in forces that can be developed within the train using pneumatic braking. Substantially higher brake cylinder pressures and braking forces could be used safely on longer loaded trains only if a faster brake signal transmission was implemented. The use of electro-pneumatic braking can effectively increase the brake command signal transmission and effectively retard the rear cars sooner and prevent severe run-in conditions.

SUMMARY OF INVENTION

This invention includes a method and apparatus for improving railway freight car braking. The improvement is achieved in providing the operation of the car with the selective use of having higher full service and/or emergency brake pressure available. This option does not have to be exercised in all braking conditions. It is available to provide an increased level of braking effort as desired in normal operation of multi-car freight trains. Importantly, this increased brake cylinder pressure can be made available while still using reservoirs having the same standard size as those used in existing freight car brake equipment. This makes it possible to retro-fit existing cars without the difficulty and added expense of implementing larger reservoirs.

The invention uses an apparatus for electro-pneumatically controlling the friction brake onboard a freight car. The freight car is equipped with a normal pneumatic brake pipe for delivering pneumatic pressure to the reservoirs and is also equipped with a friction brake operated by a pneumatic cylinder. A first supply reservoir is utilized having a volume generally equal to 3,500 cubic inches. A second supply reservoir is utilized having a volume generally equal to 2,500 cubic inches. Valving onboard the freight car responds to an electrical command signal to provide service and emergency brake operation by supplying pneumatic pressure to the brake cylinder from the reservoirs. In response to a command signal requesting a service brake level, the valving communicates the first supply reservoir to the brake cylinder to provide a pressure corresponding to the desired level of braking. In response to a command signal indicating an emergency level of braking, the valving first connects the first supply reservoir to the brake cylinder to achieve an initial pressurization in the brake cylinder. In some embodiments this may be generally equal to the equalization pressure between these two chambers, in other embodiments the first supply reservoir can be cut off at a pressure difference from the brake cylinder pressure. After the first supply reservoir is cut off from communicating with the brake cylinder, the valving connects the second supply reservoir to the brake cylinder. A sequential independent connection of the first and second supply reservoirs achieves the potential for higher brake cylinder pressure in emergency than the common connection of two reservoirs with the brake cylinder. In addition, some embodiments can utilize parallel onboard pneumatic control valves to supply the same brake cylinder in a conventional pneumatic way. Other embodiments include communicating the brake pipe directly to the brake cylinder when it is at a higher pressure than the brake cylinder after the brake cylinder has been charged from the second supply reservoir in an electronic emergency mode.

While many advantages can be seen from the practice of this invention, it will be apparent that this invention provides the ability to achieve higher brake cylinder pressures in either or both service and emergency braking conditions while utilizing the same size onboard reservoirs as have previously been used. Previously the larger of the two onboard reservoirs was used only for emergency braking, while service applications utilized only the smaller reservoir. The present invention uses the larger reservoir during service applications and utilizes each reservoir sequentially, the larger reservoir first and the smaller reservoir second, during emergency operation. This sequence may, however, be switched, resulting in no increase over conventional brakes for service applications, but the same general degree of increase over the conventional emergency brake cylinder pressure.

DESCRIPTION OF THE INVENTION

With electro-pneumatic brake control, the brakes on all cars in a long train can be applied generally simultaneously, rather than sequentially from front to back as is normal with pneumatic brake signaling systems. Therefore, the slack run-in typically caused by pneumatic brake applications does not occur. With the use of electrically controlled brakes, higher emergency braking forces can be safely used, without risk of producing damaging run-in forces in the train that can occur with a serially braked pneumatic system.

Using programmable microprocessors controlling electro-pneumatic brakes, it is possible to selectively control the admission of air under pressure to the brake cylinder from either of the supply reservoirs, or both. In some embodiments this can be controlled using electrically controlled solenoid valves. In addition, a value representing the actual weight or degree of loading of each car can be provided to that car's brake control microprocessor. This value may be provided through a number of means such as by means of onboard load sensors, by entry into the electro-pneumatic brake system from a train manifest either via the E/P line supplying the brake command signal or through radio transmission. The increased brake cylinder pressures described herein are only to be applied if the car is sufficiently loaded that the increased braking forces will not cause a significant risk of sliding the wheels.

To derive service brake cylinder pressures higher than normal full service reservoir equalization pressures, it is necessary to use the normal emergency reservoir instead of the normal auxiliary reservoir as the service air supply. In addition, it is necessary in some applications of this invention to sequence the equalization of the two reservoirs with brake cylinder, independently, for emergency applications. One of the advantages of this invention is to utilize existing standard reservoirs that are already on cars. In addition, new cars can be provided with the same reservoir that has been effectively manufactured for a number of years. These reservoirs are cast or can be fabricated, and are usually one combined structure serving to provide both reservoirs. The normal emergency reservoir is generally 3,500 cubic inches in volume, and the normal auxiliary reservoir is only 2,500 cubic inches. Because these reservoirs have become known as emergency and auxiliary respectively, this specification will consider the larger, i.e., generally having a volume of 3,500 cubic inch chamber to be the first supply reservoir, or SUPPLY I, and the smaller reservoir generally having a volume of 2,500 cubic inches to be the second supply reservoir, or SUPPLY II.

The invention uses the first supply reservoir as a source of pneumatic supply during the service mode. For any service brake application up to a full service application, the first supply reservoir may be used exclusively. Because the first supply reservoir is larger than prior designs in this mode, the maximum full service pressure available to the brake cylinder is increased over the prior art systems. When the larger 3,500 cubic inch volume of the first supply reservoir equalizes with the brake cylinder, a higher pressure is achieved in the brake cylinder than under the previous systems which used a 2,500 cubic inch auxiliary reservoir.

For operation in the emergency mode the first supply cylinder is initially connected to the brake cylinder and permitted to equalize or almost equalize with the brake cylinder pressure. Once this has occurred the first supply reservoir is cut off, closing off further communication between the first supply reservoir and the brake cylinder, and preventing pressure in the brake cylinder from feeding back to the first supply reservoir. At generally the same time, the valve is opened between the second supply reservoir (approximately 2,500 cubic inches) and the brake cylinder. When this occurs, equalization can follow between the brake cylinder and the second supply reservoir. The brake cylinder was already previously charged to a generally full service pressure level from the first supply reservoir. The equalization between the second supply reservoir and the brake cylinder takes place at a pressure that is elevated by 15 to 20% over the full service application as supplied in this invention, and also substantially higher than the emergency brake cylinder pressure as would be available under the prior art practices.

It may be expedient to cut off the first supply reservoir slightly before full equalization occurs in order to begin the second phase of the emergency mode, i.e., the communication from the second supply reservoir, in a timely fashion. It may be advantageous to establish a small final pressure increment for the cutoff, as it is understood the equalization time becomes disproportionately long to fully equalize the first supply reservoir with the brake cylinder pressure. While any pressure increment could be used depending upon the specific application, a range of generally from one to five psi is appropriate to provide adequate braking forces and achieve desired brake cylinder buildup times. This cutoff prior to full equalization permits a somewhat faster pressure buildup time in the brake cylinder during emergency operation.

There is only a certain amount of stored energy on the car to apply the brakes, which is set primarily by the size of the reservoirs and the pressures to which they are charged. By cutting off the first supply reservoir at a pressure closer to or at its independent equalization pressure with a brake cylinder, the large volume of the first supply reservoir is left at a lower pressure than the second supply reservoir and brake cylinder volumes after they have equalized in an emergency application. By isolating the first supply reservoir volume at a lower pressure, the second supply reservoir and the brake cylinder reach a higher equalization pressure than would occur in all three volumes if they had been connected together as in the prior art.

The final brake cylinder pressure that can be obtained by using the above first supply and second supply reservoir sequencing would actually be generally the same regardless of which reservoirs were used first and second. It is advantageous, however, to use the first supply reservoir first, because it is expedient to use the reservoir that supplies brake cylinder during service applications. In some cases service applications may precede an emergency application, and it is desirable to use the larger volume (3,500 cubic inches) first supply reservoir. It is also useful to use the first supply reservoir for service applications in order to obtain the desired higher full service brake cylinder pressures that can be derived by using the larger reservoir for the service brake applications. This also assures that the emergency brake cylinder pressure will not exceed the full service pressure by more than 20%, which could occur if the smaller reservoir were to be used for service applications.

The following Charts 2 and 3 show the pressures that can be obtained by this reservoir sequencing. Chart 2 represents cutting off the first supply reservoir when the brake cylinder pressure is 2 psi below what it would be at its fill equalization pressure. Chart 3 represents the pressures available when cutting the first supply reservoir off at 4 psi below its full equalization point. All of these full service and emergency pressures are in fill compliance with the power brake regulations which stipulate that emergency brake cylinder pressure be 15% to 20% higher than a full service application.

Chart 2

Cutting off Supply I reservoir when BCP is 2 psi below equalization

CHART 2

Cutting off Supply I reservoir when BCP is 2 psi below equalization:

| Initial Pressure | Service Equalization | Emergency Equalization | Ratio Emer./F. Serv. |
|---|---|---|---|
| 70 psi | 55.47 psi | 66.18 psi | 1.193 |
| 80 | 63.70 | 75.78 | 1.190 |
| 90 | 71.94 | 85.37 | 1.187 |
| 100 | 80.17 | 94.96 | 1.184 |
| 110 | 88.41 | 104.56 | 1.183 |

Chart 3

Cutting off Supply I reservoir when BCP is 4 psi below equalization

CHART 3

Cutting off Supply I reservoir when BCP is 4 psi below equalization:

| Initial Pressure | Service Equalization | Emergency Equalization | Ratio Emer./F. Serv. |
|---|---|---|---|
| 70 | 55.47 | 65.72 | 1.185 |
| 80 | 63.70 | 75.32 | 1.182 |
| 90 | 71.94 | 84.91 | 1.180 |
| 100 | 80.17 | 94.50 | 1.179 |
| 110 | 88.41 | 104.90 | 1.177 |

Chart 4 shows the degree to which the full service and emergency pressures in Chart 2 are increased over conventional pressures of the prior art devices as listed in Chart 1.

Chart 4

CHART 4

| Initial Pressure | Ratio of Increase in Full Service Pressures | Ratio of Increase in Emergency Pressures |
|---|---|---|
| 70 psi | 1.088 | 1.088 |
| 80 psis | 1.085 | 1.087 |
| 90 psis | 1.084 | 1.086 |
| 100 psi | 1.082 | 1.085 |
| 110 psi | 1.081 | 1.085 |

Chart 5 shows the ratio of increase for pressures in Chart 3 over those in Chart 1. Service equalizations are the same for both cases.

CHART 5

| Initial Pressure | Ratio of Increase in Full Service Pressures | Ratio of Increase in Emergency Pressures |
| --- | --- | --- |
| 70 psi | 1.088 | 1.080 |
| 80 psi | 1.085 | 1.080 |
| 90 psi | 1.084 | 1.080 |
| 100 psi | 1.082 | 1.080 |
| 110 psi | 1.081 | 1.080 |

It is possible if desired to increase only the emergency brake cylinder pressure and not the full service pressure. This would cause the emergency to exceed full service by more than 20% however. While this condition may not meet present regulations, it would provide improved emergency braking performance on loaded cars. The same hardware can be utilized to provide either the normal full service pressure of the prior art devices or the increased full service pressure of the present device. Feedback for the brake cylinder pressure provides that the solenoid valves can cut off the pressure in the brake cylinder at any level, including those well short of equalization of the first supply reservoir with the brake cylinder. The present invention therefore provides for a programmable, custom selectable freight car control apparatus which permits the service mode to operate at prior "normal full service" pressures or at substantially improved full service pressures and corresponding effective braking ratios.

In practicing the invention the electro-pneumatic brake control system can be utilized to even further increase the emergency brake cylinder pressure. This can be done right up to the brake pipe charging pressure by using a solenoid valve or other valve to connect the brake pipe pressure directly to the brake cylinder on each car following the equalization of the second supply reservoir with the brake cylinder. This option could be selectively usable if a pneumatic emergency was not carried out, because a pneumatic emergency application would exhaust brake pipe pressure well below brake cylinder pressure. If an emergency brake cylinder pressure increase is desired from brake pipe, a back-flow check valve can be used in series with the brake pipe feed solenoid to prevent any loss of brake cylinder pressure back through the brake pipe in the event the brake pipe pressure is lower than the brake cylinder pressure for any reason. This absolute maximization of emergency brake cylinder pressure would be of value in cases where the train speed was in danger of running away, out of control such as a long down grade, and every possible pound of retarding force could then be used to possibly prevent a runaway. An initial small boost of brake cylinder pressure could be obtained by allowing the higher brake pipe pressure to generally equalize with brake cylinder, after which any further increase would be relatively slow. Under most braking circumstances the train would be substantially stopped before the additional relatively slow feed of the brake pipe pressure into brake cylinders through the train could have much effect. However, it is possible to increase if only incrementally the maximum emergency brake cylinder pressure. While certain embodiments of the invention are described with regard to a generally 3,500 cubic inch first supply reservoir and a generally 2,500 cubic inch second supply reservoir, it is understood that respectively larger reservoirs can be used to provide the improved braking performance of this invention.

While many embodiments of the invention will utilize the existing prior art emergency and auxiliary reservoirs having fixed volumes, other reservoirs can also be used in the practice of the invention. The first supply reservoir, for example, could be equal to or greater than 3,000 cubic inches and still provide improved and increased service applications. Also, the second supply reservoir could have a volume equal to or greater than 2,000 cubic inches such that the available emergency braking under a loaded condition would be substantially increased over the present level.

Figure 1A:
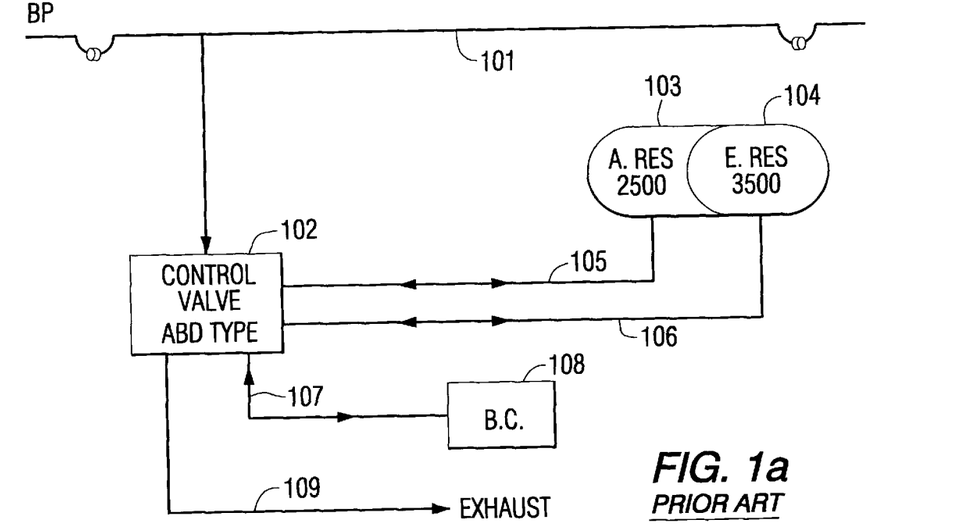
FIG. 1a is a diagrammatic representation of prior art pneumatic freight brake control systems using a freight brake control valve of the type ABD/ABDW/ABDX.

Referring now to FIG. 1a, there is shown a prior art pneumatic control valve type system such as an ABD/ABDW/ABDX/DB60. Brake pipe 101 runs the length of the train and is available on each freight car. The brake pipe contains a T-fitting or other communication to a control valve 102 which in the charging mode provides pneumatic pressure to the auxiliary reservoir 103 via a pipe 105. Auxiliary reservoir is generally approximately 2,500 square inches and can be part of an integral unit containing both an auxiliary reservoir 103 and an emergency reservoir 104. Emergency reservoir 104 is typically larger than the auxiliary reservoir and has a volume of generally 3,500 cubic inches. Control valve 102 feeds the emergency reservoir 104 via a pneumatic pipe 106. The control valve controls the flow to and from both the auxiliary reservoir 103 and the emergency reservoir 104. In normal running operation the reservoirs 103 and 104 are both fully charged to the brake pipe pressure. When a service brake application is desired the brake pipe pressure is reduced. The control valve senses the change of brake pipe pressure and the rate of change of brake pipe pressure to effect control of the friction brake operated by the brake cylinder 108. During a service application the auxiliary reservoir 103 is connected to the brake cylinder 108 through pipe 105 and control valve 102 and pipe 107. In some applications multiple cylinders are used but are represented herein as a single cylinder. A full service application is achieved when the auxiliary reservoir 103 is equalized with the brake cylinder 108. Depending upon the initial charge in the auxiliary reservoir, the brake cylinder full service application pressure will vary generally from 50 to about 82 psi as the auxiliary reservoir initial pressure varies from 70 to 110 psi.

During an emergency mode, the control valve 102 causes the auxiliary reservoir 103, the emergency reservoir 104, and the brake cylinder 108 to be all connected in fluid communication. The result is the pressure in all three chambers equalizes. While the emergency pressure can vary depending upon the initial charges in the respective chambers, the emergency brake cylinder pressure typically will be between 60 and 96 psi for initial system pressures between 70 and 110 psi, respectively. When the brake pipe 101 communicates a brake release signal, usually through an increase in brake pipe pressure, the control valve 102 causes the brake cylinder pressure 108 to be exhausted while charging reservoirs 103 and 104 from brake pipe 101.

Figure 1B:
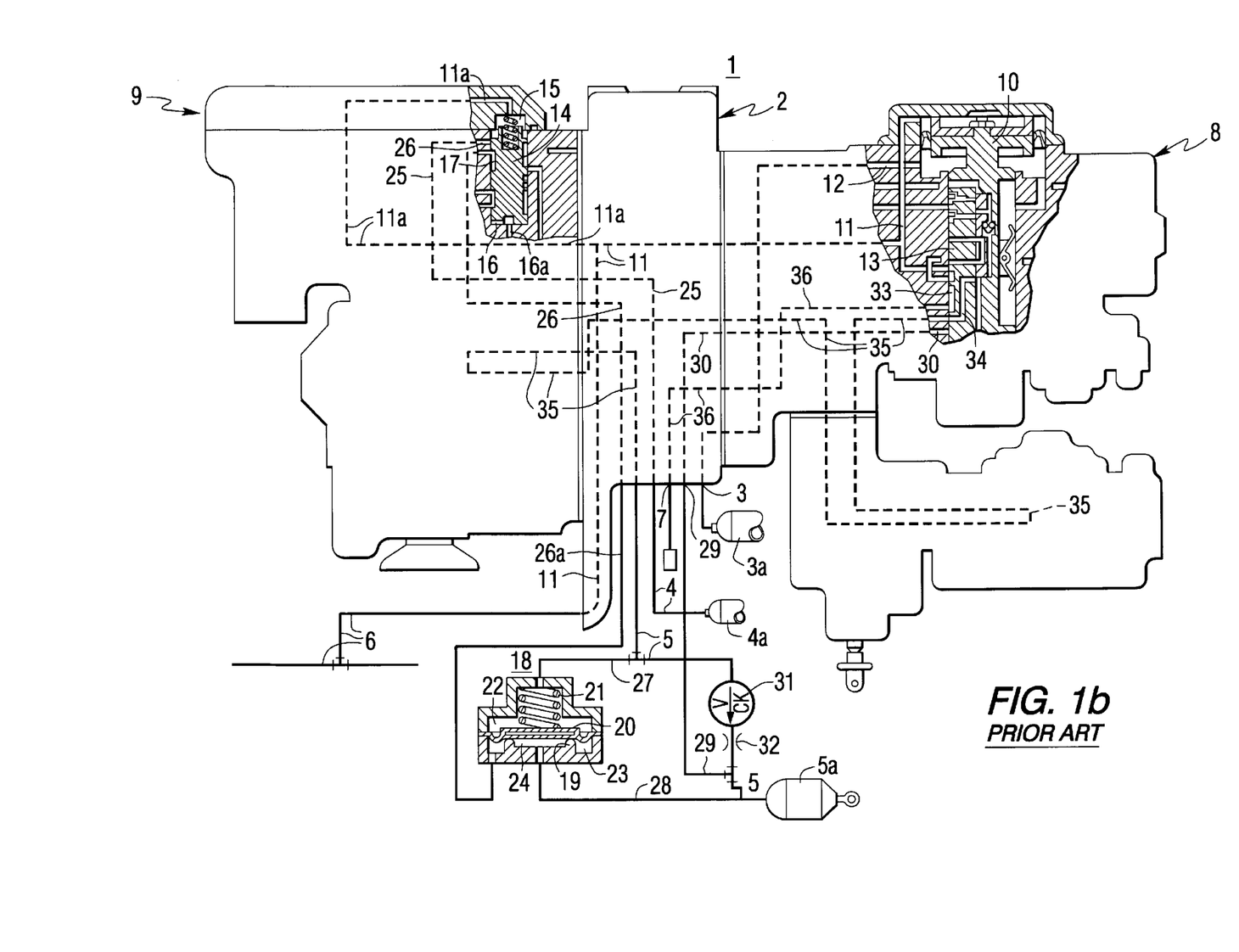
FIG. 1b is a diagrammatic representation of a prior art railway vehicle freight brake apparatus to accommodate reduced emergency reservoir volume such as that shown in U.S. Pat. No. 4,188,071.

FIG. 1b shows a prior art railway freight vehicle brake apparatus arranged to accommodate a reduced volume reservoir in a pneumatically operated system. An ABD type control valve is shown at device 1. It is, however, modified as explained in detail in the previous referenced U.S. Pat. No. 4,188,071. Control valve 1 consists of a pipe bracket 2 having pipe connections via which the control valve device is connected to a pipe 3 and an auxiliary reservoir 3a. Control valve device is connected to a pipe 4 and emergency reservoir 4a. The control valve device 1 is also connected to a pipe 5 and a brake cylinder device 5a. FIG. 1b also shows connection to a brake pipe 6 similar to that as described in FIG. 1a and a retainer exhaust pipe 7 also similar to the exhaust valve described in FIG. 1a. Shown in FIGS. 1b connected by appropriate piping to control valve device 1 is a diaphragm type cutoff valve device 18 for controlling the delivery of emergency reservoir pressure to brake cylinder device 5a. Cutoff valve device 18 is provided for isolating the emergency reservoir pressure from the brake cylinders and consequently from the auxiliary reservoir until substantially full equalization between the auxiliary pressure and the brake cylinders occurs. A one way check valve in the brake cylinder delivery line prevents backflow of the emergency reservoir pressure to the auxiliary reservoir whenever the cutoff valve device 18 operates, thereby reducing the volume into which the emergency reservoir pressure is equalized and accordingly permitting use of a smaller emergency reservoir to obtain the same emergency brake pressure as heretofore obtained with a standard size emergency reservoir. Check valve 31 in pipe 5 prevents the emergency reservoir pressure from feeding back to the auxiliary reservoir, thereby preventing any equalization of the emergency reservoir pressure therein. Accordingly the normally higher brake cylinder pressure buildup during emergency is obtained by employing an emergency reservoir 4a whose volume may be considerably less than previously possible with the reduced volume into which the emergency reservoir pressure equalizes, by reason of the auxiliary reservoir 3a being isolated therefrom. Calculations have shown that the brake cylinder pressure during emergency can build up to 60 psi, consistent with conventional emergency brake pressures, but with an emergency reservoir 4a having only a 1,200 cubic inch volume as compared to a standard 3,600 cubic inch volume.

The device of FIG. 1b thus provides a system permitting a reduction in the size of the emergency reservoir without a corresponding loss in emergency brake pressure. The utilization of a standard auxiliary reservoir and the reduced sized emergency reservoir as shown in FIG. 1b also provides a considerably shortened period to effect a brake release and recharge of the brake system throughout the train having cars equipped with this system.

Figure 2:
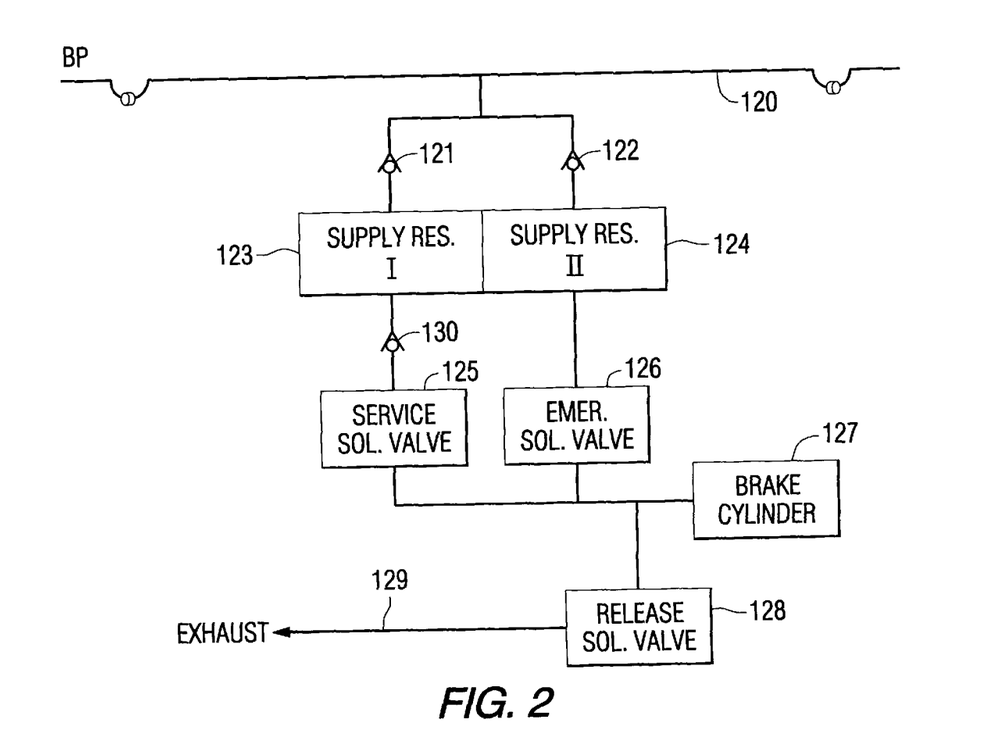
FIG. 2 is a pneumatic diagram of an embodiment of the present invention using solenoid operated valves.

Referring now to FIG. 2, there is shown a diagrammatic representation of an embodiment of the present invention. This diagram shows a pneumatic system as utilized onboard a single freight car having a brake pipe 120 feeding through a check valve 121 to a first supply reservoir, SUPPLY I, 123. Also being fed from the brake pipe is a second supply reservoir, SUPPLY II, 124 which is fed through a cutoff check valve 122. An electrically operated solenoid valve is used to control pneumatic flow in the system. Service solenoid valve 125 is fed from auxiliary reservoir 123 and when actuated feeds pneumatic pressure to brake cylinder 127. Similarly an electrically operated emergency solenoid valve 126 is fed from the auxiliary reservoir 124. Emergency solenoid valve 126 when actuated supplies pneumatic pressure from SUPPLY II to brake cylinder 127.

A third electrically operated solenoid, release solenoid valve 128, is also provided. Release solenoid valve 128 when actuated causes pneumatic pressure in brake cylinder 127 to be vented or exhausted to atmosphere via exhaust pipe 129.

In operation the embodiment in FIG. 2 receives energy onboard the car to operate a railway friction brake by means of a brake pipe 120 which charges the first and second supply reservoirs 123 and 124, respectively, through check valves 121 and 122. These supply reservoirs are initially charged before operation of the train and can be constantly under a maintaining pressure charge through the connection to the brake pipe, even when brakes are applied. In a normal service application the onboard control causes valve 125 to be activated. As shown valve 125 is an electrically operated solenoid valve but as understood this valve 125 or any of the other valves 126 and 128 may be of any valve type or function that can be used to control the fluid communication as required by this specification.

In some embodiments it may be desirable to combine electrical and/or mechanical valve portions into a single unit or into a single housing. The valve diagrams as shown in FIG. 2 are shown as separate items so that the invention can be easily understood. The service solenoid valve 125 when actuated causes supply reservoir I to be placed in fluid communication with the brake cylinder 127. The various braking or pressure levels desired under the service mode of operation may be obtained by using a pressure sensor to sense brake cylinder pressure. The sensor may be placed at the brake cylinder or anywhere in the communication line connecting to the brake cylinder. It may be convenient to place the sensor in close proximity to the port of the respective valve. In a service mode when the desired brake cylinder pressure (braking level) is reached in the brake cylinder 127, the sensor signals such pressure and the valve control operates to shut off service solenoid valve 127. During service mode, release solenoid valve 128 is closed and the desired service application pressure is maintained in the brake cylinder 127. If desired, during this time period of cutoff of SUPPLY I, the supply reservoir I can be charged through check valve 121. If after service application a release is required, release solenoid valve 128 may be activated to cause pressurized air from brake cylinder 127 to flow through to exhaust pipe 129. Once the brake cylinder pressure is returned to approximately zero release valve 128 is closed.

When a full service application is requested, the first supply reservoir 123 is put into fluid communication with the brake cylinder 127. Because the first supply reservoir 123 has a volume of 3,500 cubic inches as opposed to the normal auxiliary reservoir (2,500 cubic inches) an increased full service pressure is available to the brake cylinder with this embodiment of the invention. This results in an increase in the available full service braking.

The increase in available service is shown in Charts 4 and 5 with respective 2 and 4 psi cutoffs. This increase is generally on the order of 8% or better. This represents an additional 8% pressure to the brake cylinder which is available to provide an additional approximately 8% full service retardation braking in each car of the consist. It will be understood that it may be desirable to only implement this higher level of braking on cars that can accept increased braking without going over the limitations previously discussed. One of the areas of cars in which this embodiment is particularly applicable for increased full service braking would be in the case of substantially fully loaded freight cars. Because the invention utilizes electro-pneumatic braking, the additional brake forces on fully loaded cars does not result in excessive in-train forces and longitudinal forces.

During an emergency brake application assuming the brake cylinder is already at a less than full service application the service solenoid valve 125 first institutes a full service brake application, bringing the brake cylinder pressure in brake cylinder 127 up to within a small increment of a full brake service application level. At this point the first supply reservoir 123 is cut off by service valve 125 closing. FIG. 2 is shown with an optional backflow check valve 130 that need not be used in some embodiments. As shown, check valve 130 prevents higher pressure from the supply reservoir II 124 or brake cylinder 127 from flowing to supply reservoir I 123. When used service valve 125 need not be closed during emergency as check valve 130 automatically cuts off such flow. When supply reservoir I is cut off, supply reservoir II is fed to brake cylinder 127 by emergency solenoid valve 126 opening. During an emergency application supply reservoir II can be permitted to equalize with the air in brake cylinder 127. The second supply reservoir 124 although having a smaller volume (2,500 cubic inches) results in a higher emergency brake cylinder pressure than the prior art devices. This is because the brake cylinder has first been generally equalized with the first supply reservoir 123. During this mode the invention results in an increase in emergency pressure of approximately 8% as shown in Charts 4 and 5.

If a completed full service application is already in effect at the time of the emergency, only the second supply reservoir 124 need be admitted to brake cylinder after cutting off the first supply reservoir. In this case a very slightly higher final emergency brake cylinder pressure will result. In some applications it may be desirable to limit the maximum emergency pressure through utilization of the feedback transducer to the microprocessor controls for empty cars. Such feedback can be utilized by the microprocessor to cut off the emergency solenoid valve 126 from the supply reservoir II at a point where the brake cylinder pressure exactly equals the prior art emergency equalization pressures or other desired value. In other embodiments it will be desirable to utilize the full emergency brake cylinder pressure as available, in all cars, to the threshold limits of sliding wheels.

In other embodiments of the application the apparatus shown in FIG. 2 may be utilized to achieve an even higher emergency brake cylinder pressure. When an emergency application is initiated as previously described, the first supply reservoir 123 is first connected to brake cylinder pressure via the service solenoid valve 125. Reservoir 123 is then cut off and the second supply reservoir 124 is then put in communication with brake cylinder 127. As the supply reservoir II equalizes with the brake cylinder 127 the emergency equalization pressure is reached. When the emergency has been triggered by a non-pneumatic condition, the brake pipe 120 still can contain pressure greater than the second supply reservoir and brake cylinder pressure. The brake pipe pressure can then feed through check valve 122 through the supply reservoir II through emergency solenoid valve 126 to brake cylinder 127. This permits the brake cylinder to slowly rise above the normal brake cylinder equalization pressure.

In some embodiments such as shown in FIG. 2, it may be desirable to have a fourth solenoid valve connecting the brake cylinder directly to the brake pipe. Such a valve can have its own check valve to prevent brake cylinder pressure from backfeeding from 127 to 120. Such a fourth solenoid arrangement is shown in conjunction with the embodiment of FIG. 5, but can also be used on the embodiment of FIG. 2 or other embodiments of the invention.

Figure 5:
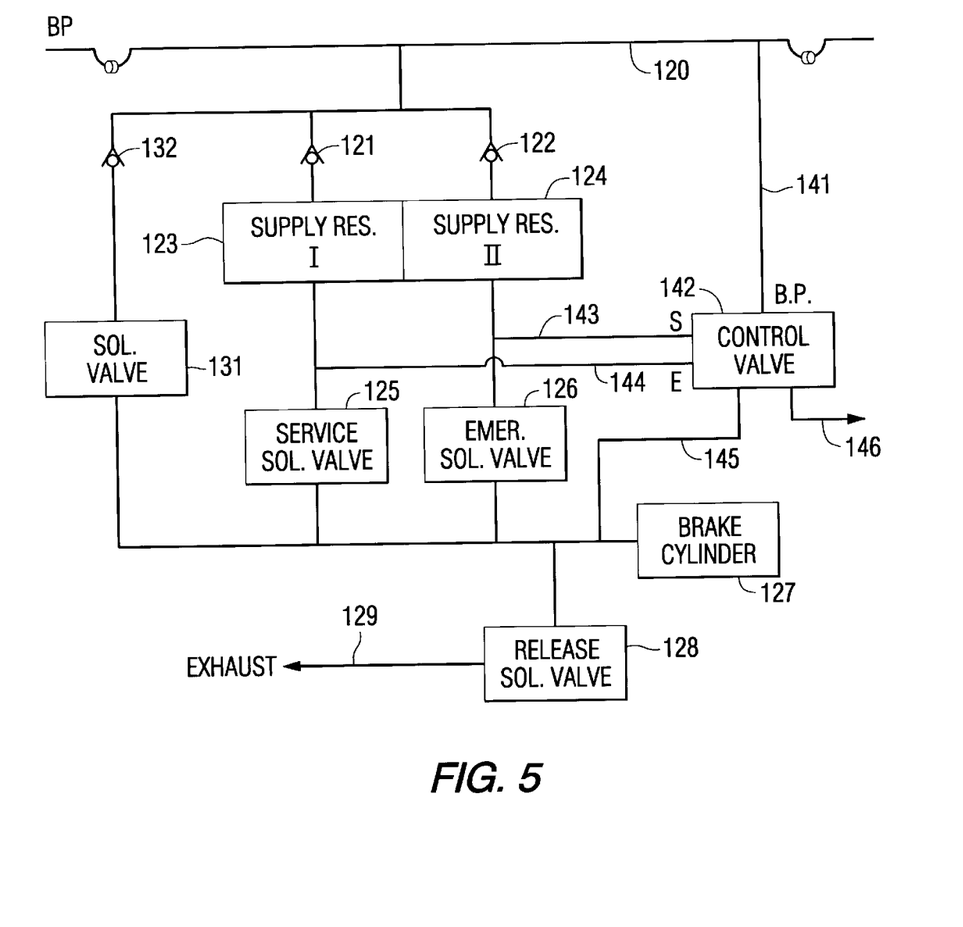
FIG. 5 is a pneumatic diagram of an embodiment similar to that of FIG. 4 with a brake pipe feed.

In other embodiments such as shown in FIG. 5 the additional solenoid valve 131 can be used to provide a parallel path around the supply reservoir 124 and solenoid valve 126. This permits solenoid valve 126 to be closed following reservoir equalization (or brake cylinder pressure buildup close to equalization) and thereby providing an even greater boost of brake cylinder pressure directly from brake pipe as supply reservoir II need not be fed from brake pipe during an emergency application. Check valve 132 prevents back flow into the brake pipe from check valve brake cylinder 127.

Figure 3:
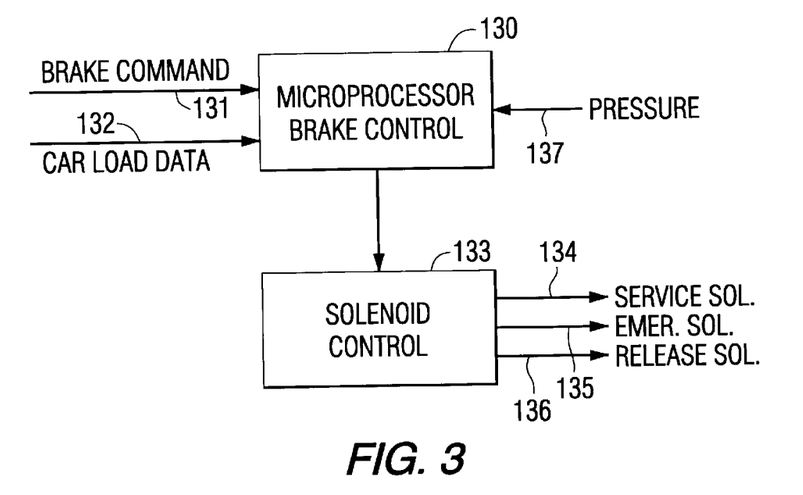
FIG. 3 is a diagrammatic representation of a microprocessor brake control used in an embodiment of the invention.

FIG. 3 shows a diagrammatic representation of an electric control system that can be used in embodiments of the invention. The system is composed of two main portions, a microprocessor brake control portion 130 and a solenoid control 133. The microprocessor brake control 130 receives brake commands from 131. Brake commands may be implemented through the utilization of a control wire running the length of the train, a radio signal communicating between the locomotive and individual cars or other means for transmitting brake command signals to individual cars in a train. In addition, the microprocessor control 130 receives car load data 132. Car load data is information concerning the specific railway freight car. The load data may be simple empty load information which is derived from an onboard sensor which detects deflection in the freight car suspension system or other sensors. Any other form of information that indicates the load condition information may also be used as an input 132 to the microprocessor controller. Some embodiments can use load information that is stored in the microprocessor onboard the car at the time the train is made up on a freight yard. Other embodiments use load information which may be transmitted to the specific car at points in transit or at other times. In one embodiment the train information concerning specific car loadings can be transmitted from an inventory or table of all of the individual car weights that make up the specific train. Such information may be contained in the locomotive and be transmitted to the individual microprocessor brake control 130 in the same way that the brake command signal 131 is transmitted to the microprocessor brake control. In addition to receiving a brake command which indicates the level of braking desired to control the train, the microprocessor also receives certain pressure signals 137. Pressure signals 137 may include a sensor which indicates the brake cylinder pressure, or in more complex embodiments, may include pressure feedback from reservoirs, or other places in the pneumatic system which permit the microprocessor to control the brake cylinder pressure from the auxiliary reservoirs and brake pipe. In some instances it may be desirable to feed the brake pipe pressure to the microprocessor control such that it can respond to changes in pneumatic pressures in the brake pipe. Some embodiments also include direct braking feedback where pressure or force transducers indicate the actual braking effort on the individual car. In some embodiments the brake command signal may, in fact, correspond to a desired car speed, acceleration, or deceleration. In such cases the feedback signals 137 may be the actual car velocity or other conditions in lieu of the brake cylinder pressure. Some systems may use the brake cylinder pressure in conjunction with outer control loops having velocity acceleration or deceleration controls.

The microprocessor brake control exercises its command over the respective solenoid operated valves such as 125, 126, 128 and 132 through the use of a solenoid control 133. The microprocessor control outputs signals to the solenoid control 133 so that the solenoid control 133 provides the electrical currents to the respective coils of the electrically operated solenoid valves.

The embodiments shown in FIG. 3 shows three output coil signals namely the service solenoid 134, the emergency solenoid 135 and the release solenoid 136. If an additional straight air solenoid from the brake pipe 120 to the brake cylinder 127 is desired, that solenoid can also be controlled by the solenoid control 133. As has previously been described, the embodiment as shown in FIG. 2 contemplates the utilization of three separate solenoid operated valves 125, 126 and 128, however, it is also contemplated that other valve arrangements using multiple mechanical valves can be used. In such other arrangements the solenoid control 133 would have respectively different outputs corresponding to the specific electrically requirements of the service, emergency, and release function valve or valves.

While the invention may be used on new freight cars, it will also be apparent to those skilled in the art that it is particularly advantageous to use this system with existing freight vehicles that already have reservoirs sized to permit the higher pressures that the invention can deliver to the brake cylinder. Embodiments of the invention may be practiced utilizing any type of pneumatic equipment or electro-pneumatic controls can also be utilized in conjunction with the freight brake control equipment and method described in copending U.S. applications Ser. No. 08/597,277 filed Feb. 6, 1996, Ser. No. 08/630,075 filed Apr. 15, 1996, and Ser. No. 08/637,873 filed Apr. 25, 1996 incorporated herein by reference.

Figure 4:
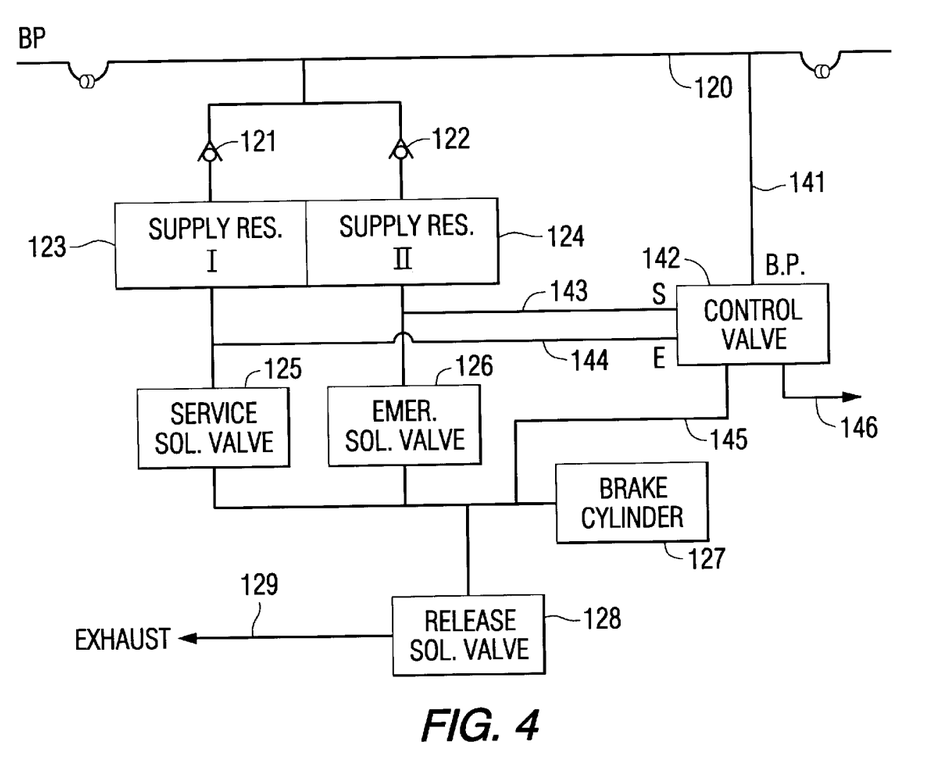
FIG. 4 is a pneumatic diagram of an embodiment of the invention utilizing solenoid operated valves and having a conventional control valve operating in parallel.

Referring to FIG. 4, there is shown an alternative embodiment similar to that shown in FIG. 2. In this pneumatic drawing there appears a first supply, a second supply reservoirs and service and emergency solenoid operated valves. These in turn with solenoid release valve 128 are used to control the electro-pneumatic operation of brake cylinder 127. However, also attached to brake pipe 120 is brake pipe line 141 feeding pneumatic pressure from the brake pipe to a pneumatic control valve 142. In this instance, the second supply reservoir is fed through line 143 to the service board of the control valve 142. Similarly the first supply reservoir is fed through a pneumatic line 144 to the emergency reservoir port on the pneumatic control valve 142. The pneumatic control valve 142 may be of the ABD/ABDX/DB60 or similar pneumatic control valve. Pneumatic control valve 142 contains an exhaust port and an exhaust pipe 146 which is used to exhaust air when the system is working on the pneumatic control through pneumatic control valve 142. The pneumatic control valve also operates to supply the brake cylinder 127 through the brake cylinder pneumatic line 145. This operation uses pneumatic solenoid valves 125, 126 and 128 can be utilized to control operation of the brake cylinder 127 or the system may be used in as purely pneumatic control system using control valve 142 to operate brake cylinder 127. When the system is operating in the pneumatic only mode, using control valve 142, the first supply reservoir 123 which is the larger of the two reservoirs is utilized as an emergency reservoir and is fed to the emergency reservoir port of control valve 142. Similarly, the smaller reservoir, second supply reservoir 124 is utilized as the normal auxiliary reservoir and fed to the auxiliary reservoir port on the control valve 142. In contrasting the two operations as shown in FIG. 42 the service mode is utilized in the electro-pneumatic portion through the auxiliary reservoir 123 and service solenoid valve 125. This contrasts with a service application using pneumatic control valve 142 which uses the second supply reservoir 124 through control valve 142 to brake cylinder 127. However, as shown the control valve 142 will not deliver the higher desired service and emergency rates that the electro-pneumatic equipment shown in FIGS. 2 and 4 provide. However, the pneumatic control valve 42 does provide adequate service and emergency pressures consistent with present practice.

The method of the invention uses selectively communicating a first supply reservoir having a capacity generally 3,500 cubic inches to the brake cylinder in response to an electro-pneumatic signal received onboard the train indicating a service level of braking. Upon receipt of a brake signal command indicating an emergency brake level, the first supply reservoir is first connected to the brake cylinder to provide an initial pressure charge to the brake cylinder. In some embodiments this initial charged can be full equalization, in other embodiments a pressure differential between the brake cylinder and the first supply reservoir will initiate cutoff of the first supply reservoir. After the first supply reservoir has charged the brake cylinder and been cut off from communication with the brake cylinder, the second supply reservoir having a capacity of at least approximately 2,500 cubic inches is placed in fluid communication with brake cylinder. In some embodiments an additional communication between the brake pipe and the brake cylinder is established after the second supply reservoir has generally equalized with the brake cylinder. In other embodiments the first supply reservoir can have a capacity generally equal to 2,500 cubic inches or greater, and the second supply reservoir can be generally equal to 3,500 cubic inches or greater. The increased pressure can be utilized especially in loaded cars. In some embodiments a standard pneumatic freight brake control valve is operated in parallel with the electro-pneumatic operation. Pressure sensors can be used to sense the pressure in the brake pipe, first supply reservoir, second supply reservoir, or brake cylinder. Sequencing of the communication can be controlled by the pressures sensed in those chambers and controlled by a microprocessor.

While certain preferred embodiments of the invention have been shown and described in this specification, it will be clear to those skilled in the art that other apparatus and methods may be utilized in practicing the invention consistent with the following claims.

I claim:

1. A railway freight car brake control apparatus for electro-pneumatic control of the friction brakes onboard such railway freight car, such car having a pneumatic brake pipe for delivery of pneumatic pressure and having a pneumatic brake cylinder for actuation of such friction brakes, such apparatus comprising:

(a) a first supply reservoir having a volume generally equal to or greater than 3,500 cubic inches in communication to charge with pressurized fluid from such brake pipe;

(b) a second supply reservoir having a volume generally equal to or greater than 2,500 cubic inches in communication to charge with pressurized fluid from such brake pipe;

(c) means for receiving electrical brake command signals onboard such car;

(d) service valve selectively communicating said first supply reservoir to said brake cylinder in response to said brake command signal corresponding to a service brake level, and said service valve controlling communication of said first supply reservoir to said brake cylinder in response to said brake command signal corresponding to an emergency brake level; and (e) emergency valve communicating said second supply reservoir to said brake cylinder after said service valve has communicated said first supply reservoir to said brake cylinder and said first supply reservoir has been cut off from a backflow of pressure from said brake cylinder, said emergency valve communicating said second supply reservoir to said brake cylinder in response to a brake command signal corresponding to an emergency brake level and when said car is in a loaded condition, whereby during an emergency brake application the resulting pressure in said brake cylinder is greater than the pressure if said first supply reservoir and said second supply reservoir and said brake cylinder were allowed to equalize.

2. The railway freight car brake control apparatus of claim 1 wherein said service valve selectively cuts off the supply of pneumatic pressure from said first supply reservoir to such brake cylinder within a range of pressures less than the full equalization pressure that would exist between said first supply reservoir and such brake cylinder.

3. The railway freight car brake control apparatus of claim 2 wherein said range of pressures includes a range of from generally one to generally five psi.

4. The railway freight car brake control apparatus of claim 1 wherein said service valve cuts off fluid communication between said first supply reservoir and said brake cylinder pressure when a preselected differential pressure exists between said first supply reservoir and said brake cylinder.

5. The railway freight car brake control apparatus of claim 4 herein said pressure differential is generally in the range of from zero to five psi.

6. The railway freight car brake control apparatus of claim 1 further including a microprocessor to control operation of said service valve and said emergency valve in response to said brake command signals.

7. The railway freight car brake control apparatus of claim 6 wherein said microprocessor receives pressure feedback signals from at least one of said first supply reservoir, said second supply reservoir, and said brake cylinder.

8. A railway freight car brake control apparatus for electro-pneumatic control of the friction brakes onboard such railway freight car, such car having a pneumatic brake pipe for delivery of pneumatic pressure and having a pneumatic brake cylinder for actuation of such friction brakes, such apparatus comprising:

(a) a first supply reservoir having a volume generally equal to or greater than 3,500 cubic inches in communication to charge with pressurized fluid from such brake pipe;

(b) a second supply reservoir having a volume generally equal to or greater than 2,500 cubic inches in communication to charge with pressurized fluid from such brake pipe:

(c) means for receiving electrical brake command signals onboard such car;

(d) service valve selectively communicating said first supply reservoir to said brake cylinder in response to said brake command signal corresponding to a service brake level, and said service valve controlling communication of said first supply reservoir to said brake cylinder in response to said brake command signal corresponding to an emergency brake level;

(e) emergency valve communicating said second supply reservoir to said brake cylinder after said service valve has communicated said first supply reservoir to said brake cylinder and said first supply reservoir has been cut off from a backflow of pressure from said brake cylinder, said emergency valve communicating said second supply reservoir to said brake cylinder in response to a brake command signal corresponding to an emergency brake level and when said car is in a loaded condition, whereby during an emergency brake application the resulting pressure in said brake cylinder is greater than the pressure if said first supply reservoir and said second supply reservoir and said brake cylinder were allowed to equalize; and said emergency valve further includes communicating such brake pipe to such brake cylinder to feed pneumatic pressure from said brake pipe to said brake cylinder during an emergency application.

9. The railway freight car brake control apparatus of claim 8 wherein said emergency valve includes cutting off communication between said second supply reservoir and said brake pipe and communicating said brake pipe to said brake cylinder through an emergency brake pipe valve during an emergency brake application.

10. The railway freight car brake control apparatus of claim 9 further including wherein said service valve selectively cuts off the supply of pneumatic pressure from said first supply reservoir to such brake cylinder within a range of pressures less than the full equalization pressure that would exist between said first supply reservoir and such brake cylinder.

11. The railway freight car brake control apparatus of claim 10 further including wherein said range of pressures includes a range of from generally one to generally five psi.

12. A railway freight car brake control apparatus for electro-pneumatic control of the friction brakes onboard such railway freight car, such car having a pneumatic brake pipe for delivery of pneumatic pressure and having a pneumatic brake cylinder for actuation of such friction brakes, such apparatus comprising:

(a) a first supply reservoir having a volume generally equal to or greater than 3,500 cubic inches in communication to charge with pressurized fluid from such brake pipe:

(b) a second supply reservoir having a volume generally equal to or greater than 2,500 cubic inches in communication to charge with pressurized fluid from such brake pipe:

(c) means for receiving electrical brake command signals onboard such car:

(d) service valve selectively communicating said first supply reservoir to said brake cylinder in response to said brake command signal corresponding to a service brake level, and said service valve controlling communication of said first supply reservoir to said brake cylinder in response to said brake command signal corresponding to an emergency brake level; and (e) emergency valve communicating said second supply reservoir to said brake cylinder after said service valve has communicated said first supply reservoir to said brake cylinder and said first supply reservoir has been cut off from a backflow of pressure from said brake cylinder, said emergency valve communicating said second supply reservoir to said brake cylinder in response to a brake command signal corresponding to an emergency brake level and when said car is in a loaded condition, whereby during an emergency brake application the resulting pressure in said brake cylinder is greater than the pressure if said first supply reservoir and said second supply reservoir and said brake cylinder were allowed to equalize;

(f) said service valve cutting off fluid communication between said first supply reservoir and said brake cylinder pressure when a preselected differential pressure exists between said first supply reservoir and said brake cylinder; and (g) a pneumatic control valve operating in parallel to said service valve and said emergency valve, said pneumatic control valve using said second supply reservoir for applying a service brake application.

13. A railway freight car brake control apparatus for electro-pneumatic control of the friction brakes onboard such railway freight car, such car having a pneumatic brake pipe for delivery of pneumatic pressure and having a pneumatic brake cylinder for actuation of such friction brakes, such apparatus comprising:

(a) a first supply reservoir having a volume generally equal to or greater than 3,500 cubic inches in communication to charge with pressurized fluid from such brake pipe;

(b) a second supply reservoir having a volume generally equal to or greater than 2,500 cubic inches in communication to charge with pressurized fluid from such brake pipe;

(c) means for receiving electrical brake command signals onboard such car;

(d) service valve selectively communicating said first supply reservoir to said brake cylinder in response to said brake command signal corresponding to a service brake level, and said service valve controlling communication of said first supply reservoir to said brake cylinder in response to said brake command signal corresponding to an emergency brake level; and (e) emergency valve communicating said second supply reservoir to said brake cylinder after said service valve has communicated said first supply reservoir to said brake cylinder and said first supply reservoir has been cut off from a backflow of pressure from said brake cylinder, said emergency valve communicating said second supply reservoir to said brake cylinder in response to a brake command signal corresponding to an emergency brake level and when said car is in a loaded condition, whereby during an emergency brake application the resulting pressure in said brake cylinder is greater than the pressure if said first supply reservoir and said second supply reservoir and said brake cylinder were allowed to equalize;

(f) said service valve cutting off fluid communication between said first supply reservoir and said brake cylinder pressure when a preselected differential pressure exists between said first supply reservoir and said brake cylinder; and (g) said emergency valve further includes communicating such brake pipe to such brake cylinder to feed pneumatic pressure from said brake pipe to said brake cylinder during an emergency application.

14. A railway freight car brake control apparatus for electro-pneumatic control of the friction brakes onboard such railway freight car, such car having a pneumatic brake pipe for delivery of pneumatic pressure and having a pneumatic brake cylinder for actuation of such friction brakes, such apparatus comprising:

(a) a first supply reservoir having a volume generally equal to or greater than 3,500 cubic inches in communication to charge with pressurized fluid from such brake pipe;

(b) a second supply reservoir having a volume generally equal to or greater than 2,500 cubic inches in communication to charge with pressurized fluid from such brake pipe;

(c) means for receiving electrical brake command signals onboard such car;

(d) service valve selectively communicating said first supply reservoir to said brake cylinder in response to said brake command signal corresponding to a service brake level, and said service valve controlling communication of said first supply reservoir to said brake cylinder in response to said brake command signal corresponding to an emergency brake level; and (e) emergency valve communicating said second supply reservoir to said brake cylinder after said service valve has communicated said first supply reservoir to said brake cylinder and said first supply reservoir has been cut off from a backflow of pressure from said brake cylinder, said emergency valve communicating said second supply reservoir to said brake cylinder in response to a brake command signal corresponding to an emergency brake level and when said car is in a loaded condition, whereby during an emergency brake application the resulting pressure in said brake cylinder is greater than the pressure if said first supply reservoir and said second supply reservoir and said brake cylinder were allowed to equalize;

(f) said service valve cutting off fluid communication between said first supply reservoir and said brake cylinder pressure when a preselected differential pressure exists between said first supply reservoir and said brake cylinder; and (g) said emergency valve includes cutting off communication between said second supply reservoir and said brake pipe and communicating said brake pipe to said brake cylinder through an emergency brake pipe valve during an emergency brake application.

15. A railway freight car brake control apparatus for electro-pneumatic control of the friction brakes onboard such railway freight car, such car having a pneumatic brake pipe for delivery of pneumatic pressure and having a pneumatic brake cylinder for actuation of such friction brakes, such apparatus comprising:

(a) a first supply reservoir having a volume generally equal to or greater than 3,500 cubic inches in communication to charge with pressurized fluid from such brake pipe;

(b) a second supply reservoir having a volume generally equal to or greater than 2,500 cubic inches in communication to charge with pressurized fluid from such brake pipe;

(c) means for receiving electrical brake command signals onboard such car;

(d) service valve selectively communicating said first supply reservoir to said brake cylinder in response to said brake command signal corresponding to a service brake level, and said service valve controlling communication of said first supply reservoir to said brake cylinder in response to said brake command signal corresponding to an emergency brake level;

(e) emergency valve communicating said second supply reservoir to said brake cylinder after said service valve has communicated said first supply reservoir to said brake cylinder and said first supply reservoir has been cut off from a backflow of pressure from said brake cylinder, said emergency valve communicating said second supply reservoir to said brake cylinder in response to a brake command signal corresponding to an emergency brake level and when said car is in a loaded condition, whereby during an emergency brake application the resulting pressure in said brake cylinder is greater than the pressure if said first supply reservoir and said second supply reservoir and said brake cylinder were allowed to equalize; and a pneumatic control valve operating in parallel to said service valve and said emergency valve, said pneumatic control valve using said second supply reservoir for applying a service brake application.

16. The railway freight car brake control apparatus of claim 15 wherein said service valve includes a check valve for limiting back pressure flow into said first supply reservoir through said service valve.

17. A railway freight car brake control apparatus for electro-pneumatic control of the friction brakes onboard such railway freight car, such car having a pneumatic brake pipe for delivery of pneumatic pressure and having a pneumatic brake cylinder for actuation of such friction brakes, such apparatus comprising:

(a) a first supply reservoir having a volume generally equal to or greater than 3,500 cubic inches in communication to charge with pressurized fluid from such brake pipe;

(b) a second supply reservoir having a volume generally equal to or greater than 2,500 cubic inches in communication to charge with pressurized fluid from such brake pine;

(c) means for receiving electrical brake command signals onboard such car;

(d) service valve selectively communicating said first supply reservoir to said brake cylinder in response to said brake command signal corresponding to a service brake level, and said service valve controlling communication of said first supply reservoir to said brake cylinder in response to said brake command signal corresponding to an emergency brake level; and (e) emergency valve communicating said second supply reservoir to said brake cylinder after said service valve has communicated said first supply reservoir to said brake cylinder and said first supply reservoir has been cut off from a backflow of pressure from said brake cylinder, said emergency valve communicating said second supply reservoir to said brake cylinder in response to a brake command signal corresponding to an emergency brake level and when said car is in a loaded condition, whereby during an emergency brake application the resulting pressure in said brake cylinder is greater than the pressure if said first supply reservoir and said second supply reservoir and said brake cylinder were allowed to equalize;

(f) said service valve includes at least one electrically operated solenoid valve; and (g) said emergency valve includes at least one electrically operated solenoid valve.

18. The railway freight car brake control apparatus of claim 17 wherein said service valve cuts off fluid communication between said first supply reservoir and said brake cylinder when a differential pressure exists between said first supply reservoir and said brake cylinder.

19. The railway freight car brake control apparatus of claim 17 wherein said service valve selectively cuts off the supply of pneumatic pressure from said first supply reservoir to such brake cylinder within a range of pressures less than the full equalization pressure that would exist between said first supply reservoir and such brake cylinder.

20. The railway freight car brake control apparatus of claim 17 further including a microprocessor to control said service valve and said emergency valve in response to said brake command signals; and receives pressure feedback signals from at least one of said first supply reservoir, said second supply reservoir, and said brake cylinder.

21. The railway freight car brake control apparatus of claim 17 wherein said service valve includes a check valve for limiting back pressure flow into said first supply reservoir through said service valve.

22. The railway freight car brake control apparatus of claim 19 wherein said service valve includes a check valve for limiting back pressure flow into said first supply reservoir through said service valve.

23. A railway freight car brake control apparatus for electro-pneumatic control of the friction brakes onboard such railway freight car, such car having a pneumatic brake pipe for delivery of pneumatic pressure and having a pneumatic brake cylinder for actuation of such friction brakes, such apparatus comprising:

(a) a first supply reservoir having a volume generally equal to or greater than 3,000 cubic inches in communication to charge with pressurized fluid from such brake pipe;

(b) a second supply reservoir having a volume generally equal to or greater than 2,000 cubic inches in communication to charge with pressurized fluid from such brake pipe;

(c) means for receiving electrical brake command signals onboard such car;

(d) service valve selectively communicating said first supply reservoir to said brake cylinder in response to said brake command signal corresponding to a service brake level, and said service valve controlling communication of said first supply reservoir to said brake cylinder in response to said brake command signal corresponding to an emergency brake level; and (e) emergency valve communicating said second supply reservoir to said brake cylinder after said service valve has communicated said first supply reservoir to said brake cylinder and said first supply reservoir has been cut off from a backflow of pressure from said brake cylinder, said emergency valve communicating said second supply reservoir to said brake cylinder in response to a brake command signal corresponding to an emergency brake level and when said car is in a loaded condition, whereby during an emergency brake application the resulting pressure in said brake cylinder is greater than the pressure if said first supply reservoir and said second supply reservoir and said brake cylinder were allowed to equalize.

24. A method of operating a railway freight brake onboard a freight car, such car having a pneumatic brake pipe for the delivery of pneumatic pressure and having a pneumatically operated brake cylinder for actuation of friction brakes, comprising:

(a) charging a first supply reservoir having a volume generally equal to or greater than 3,500 cubic inches from such brake pipe;

(b) charging a second supply reservoir having a volume generally equal to or greater than 2,000 cubic inches from such brake pipe;

(c) receiving an electric brake command signal onboard such car;

(d) selectively connecting said first supply reservoir to said brake cylinder in response to said brake command signal corresponding to a service brake application;

(e) connecting said first supply reservoir to said brake cylinder in response to said brake command signal corresponding to an emergency brake level;

(f) cutting off the connection between said first supply reservoir and said brake cylinder after the pressure in said brake cylinder has reached a predetermined level in response to said brake command signal corresponding to an emergency brake level; and (g) connecting said second supply reservoir to said brake cylinder after said first supply reservoir has been cut off from said brake cylinder in response to said brake command signal corresponding to an emergency brake level.

25. The method of operating a railway freight brake of claim 24 further comprising communicating said second supply reservoir to said brake cylinder when said freight car is in a loaded condition such that the resulting pressure in said brake cylinder is greater than the pressure that would result if said first supply reservoir and said second supply reservoir and said brake cylinder were allowed to equalize.

26. The method of controlling a railway freight car brake of claim 25 wherein said connection between said first supply reservoir and said brake cylinder is cut off within a range of pressures less than the full equalization pressure that would exist between said first supply reservoir and such brake cylinder.

27. The method of controlling a railway freight car brake of claim 26 wherein said cutoff of said first supply reservoir from said brake cylinder occurs within a range of generally from one to five psi.

\* \* \* \* \*